United States Patent
Dziedzic et al.

(10) Patent No.: US 6,443,846 B1
(45) Date of Patent: Sep. 3, 2002

(54) SPARE TIRE CARRIER TORQUE-LIMITING SLIP MECHANISM

(75) Inventors: Jerzy Dziedzic, Milford; Wojciech Janczak, Commerce, both of MI (US)

(73) Assignee: Edscha North America, Southfield, MI (US)

( * ) Notice: Subject to any disclaimer, the term of this patent is extended or adjusted under 35 U.S.C. 154(b) by 44 days.

(21) Appl. No.: 09/747,258

(22) Filed: Dec. 22, 2000

(51) Int. Cl.[7] .............................. F16D 3/52; F16D 93/20
(52) U.S. Cl. .............................. 469/41; 464/30; 464/37; 464/82; 192/56.1
(58) Field of Search .............................. 464/41, 30, 37, 464/51, 81, 82, 185; 192/56.1

(56) References Cited

U.S. PATENT DOCUMENTS

| | | | | |
|---|---|---|---|---|
| 1,962,993 A | * | 6/1934 | Leece | 464/30 |
| 2,143,710 A | * | 1/1939 | Murray | 464/30 |
| 2,255,742 A | * | 9/1941 | Schilling | 464/30 |
| 2,688,857 A | * | 9/1954 | Jones | 464/30 |
| 2,758,457 A | * | 8/1956 | Meyer et al. | 464/30 |
| 3,802,222 A | * | 4/1974 | Weber | 464/30 |
| 4,043,437 A | * | 8/1977 | Taylor | 192/56.1 |
| 4,406,319 A | * | 9/1983 | McNiel et al. | 160/177 |
| 4,600,352 A | * | 7/1986 | Ivan | 414/463 |
| 4,884,785 A | | 12/1989 | Denman et al. | |
| 4,969,630 A | | 11/1990 | Denman et al. | |
| 5,290,014 A | | 3/1994 | Fergison, Jr. | |
| 5,297,913 A | | 3/1994 | Au | |
| 5,718,553 A | | 2/1998 | Via et al. | |
| 5,975,498 A | | 11/1999 | Sauner | |
| 5,993,133 A | | 11/1999 | Murray et al. | |
| 6,299,403 B1 | * | 10/2001 | Lee | 414/463 |
| 6,309,303 B1 | * | 10/2001 | Vodicka | 464/30 |

* cited by examiner

Primary Examiner—Lynne H. Browne
Assistant Examiner—Kenn Thompson
(74) Attorney, Agent, or Firm—Rader, Fishman & Grauer PLLC

(57) ABSTRACT

A torque-limiting slip mechanism for a spare tire carrier includes a camshaft with a plurality of mating surfaces and differently shaped intermediate segments, a tire carrier drive with an inner pocket circumscribed by an interior wall, and a plurality of free-floating arcuate spring elements having a central body and ends that are compressed between the mating surfaces of camshaft and the interior wall. The central body engages the camshaft and the free ends engage the interior wall. In practice the spring elements are automatically centered with respect to their mating surface before a torque is applied. When the torque is greater than the pre-determined torque, however, each spring element deforms elastically as it selectively engages mating surfaces and intermediate segments so that the camshaft rotates with respect to the carrier drive.

20 Claims, 3 Drawing Sheets

SPARE TIRE CARRIER TORQUE-LIMITING SLIP MECHANISM

BACKGROUND OF THE INVENTION

1. Field of the Invention

The Present Invention is related to a torque-limiting slip mechanism for an underbody spare tire carrier.

2. Description of the Related Art

Spare tire carriers for use with the underbody of vehicles are well known. These types of carriers have been developed to include a winch-based mechanism that is used to raise and lower a tire received in the underbody carrier. The winch includes a first end that includes a tire holder and a second end that engages a lift drum. The wire is passed through a central opening of the tire and the holder engages the tire underside. Thus, as an individual, using an appropriate tool that engages the lift drum, rotates the lift drum about a fixed axis, the wire is wound or unwound about the lift drum, thereby lifting or lowering the tire. When the tire is properly lifted to its stored orientation within the carrier, it is sandwiched between the vehicle underside and the tire holder and prevented from movement even during substantial vehicle vibration.

In practice, prior art units have been subject to undesirable failure. What happens is that the winch mechanism is used to lift a tire from the ground to its stored orientation within the carrier. However, an individual using the winch is unable to determine when tire is properly stored. Thus, in accordance with the appropriate desire to make sure that the tire holder properly traps the tire within the carrier, there is a tendency to continue to exert torque upon the lift drum in an attempt to further rotate the wire about the lift drum, placing ever-increasing tension on the wire after the tire is totally stored. While some tire compression is appropriate, placing undue tension on the wire may cause it to snap, resulting in the tire dropping to the ground and carrier failure.

Complicated overrunning clutches have been devised to prevent additional lift drum rotation once a predetermined maximum tensile stress has been placed on the wire. In practice, after a maximum acceptable tension has been placed on the wire, additional torque application will result in the clutch overrunning to prevent additional tension from being placed on the wire. However, such clutches are complex, expensive to manufacture, heavy, and take up extremely valuable vehicle packaging space. The clutch must be substantially redesigned depending on critical tire characteristics (e.g., weight, diameter, and tire thickness). Even when properly designed, prior art clutches have a tendency to adversely react to long-term detrimental environmental conditions including rusting of iron-based components or increased brittleness of plastic based components that may freeze up or lock the carrier in its locked orientation. Carrier failure will not be discovered until a flat tire requires the use of carrier. Under such circumstances, a high stress situation is significantly heightened.

In an attempt to simplify the use of complicated overrunning clutches, an attempt has been made to develop a slip mechanism. In one known slip mechanism a clutch plate includes a pair of diametrically opposed ears that project axially into curved portions of a pair of arcuate leaf-type metal springs having opposing hooked shape end portions. The springs are carried by a clutch drive plate having a pair of generally T-shaped cavities for receiving and retaining the end portions of the springs. The clutch drive plate has a center hole that receives a mating hub portion of a drive shaft so that the clutch plate is positively driven by the drive shaft. When excessive torque is applied to the drive shaft, the ears ideally cam the springs inwardly. In practice, however, the ears have an undesirable tendency to either bend outwardly in response to the biasing force of the springs or even break off, resulting in slip mechanism failure. Even when operational, a jarring force intensified response is received by carrier operator as the slip mechanism is activated by the curved portions of the springs abruptly engaging the ears, suggesting carrier failure even as the slip mechanism is being operated.

In an alternative approach, the ears are replaced by openings in the clutch plate. The openings facilitate the entry of contaminants into the slip mechanism while not eliminating the jarring force intensified response.

One further alternative approach has a plurality springs rigidly connected at opposing ends to fixed receiving pockets of the clutch plate. A central portion of each spring selectively engages a cam lobe connected to the drive shaft. When slip is required, the wire springs deform outwardly around the cain lobes and permit the clutch plate to rotate relative to the clutch cam. The jarring force intensified force still results. Moreover, as the cam lobes selectively and abruptly engage the wire springs, spring fatigue or pocket failure may prevent proper slip mechanism operation and carrier failure.

Thus, for the types of known slip mechanisms that have been developed as an alternative to overrunning clutches, the springs are rigidly secured at opposing ends, and forced to selectively and abruptly engage an opposing structure, resulting in either abrupt spring contraction or failure of the opposing structure. When the spring abruptly contracts, the carrier operator experiences a jarring force that is disconcerting to the carrier operator, and may result in an a feeling that the carrier has somehow failed rather than a realization that the override slip mechanism has been used to minimize such failure. Several of these types of mechanisms are also prone to inappropriate environmental contamination.

SUMMARY OF THE INVENTION

The present invention is directed to a simplified slip mechanism for use with an underbody tire carrier, which comprises a camshaft, a tire carrier drive and a plurality of free-floating non-rigidly secured spring elements disposed between the camshaft and the tire carrier drive. An individual applies torque through the camshaft. The spring elements prevent relative rotation between the camshaft and the drive such that the drive and the spring elements rotate through the same angular extent as the camshaft when a torque is applied to the camshaft unless a pre-determined torque is exceeded. Thus, a tire disposed between a tire holder hanging from a wire and the underbody of a vehicle may be raised or lowered as the wire is wound or unwound through the rotation of the carrier drive. However, once the tire is appropriately stored, the application of any additional torque by the camshaft upon the carrier drive is prevented by the elastic deformation of the spring elements to permit relative rotation between the camshaft and carrier drive.

The camshaft includes an outer section, a central section, and an inner section, the central section including a plurality of mating surfaces and intermediate segments. The carrier drive includes a pocket adapted to receive the central section of the camshaft, the pocket having an interior wall. The spring elements are disposed between the central section and the interior wall. The elements are preferably arcuate with an interior concave surface of a central body engaging a mating surface and free ends engaging the interior wall. When there is no torque applied, the spring elements are automatically centered. However, when a torque is applied that is greater than a pre-determined torque, the spring elements elastically deform with respect to the difference in surface dimension and characteristics between the mating surfaces and intermediate segments as the camshaft continues to rotate.

The slip mechanism of the present invention is deceptively simple. It takes key advantage of having free-floating spring elements to promote both normal drive and slip as varying torque conditions require. It is also extremely compact, taking up little if any additional room within the carrier. When an overriding torque is applied, the mechanism activates smoothly while still providing an appropriate resistance that indicates that input torque is no longer required to complete tire storage within the carrier. It is also very easy to adjust the inventive mechanism for different tire types through the use of different spring elements or the interaction between the camshaft, the spring elements, and the interior wall.

DESCRIPTION OF THE PREFERRED EMBODIMENT

Figure 1:
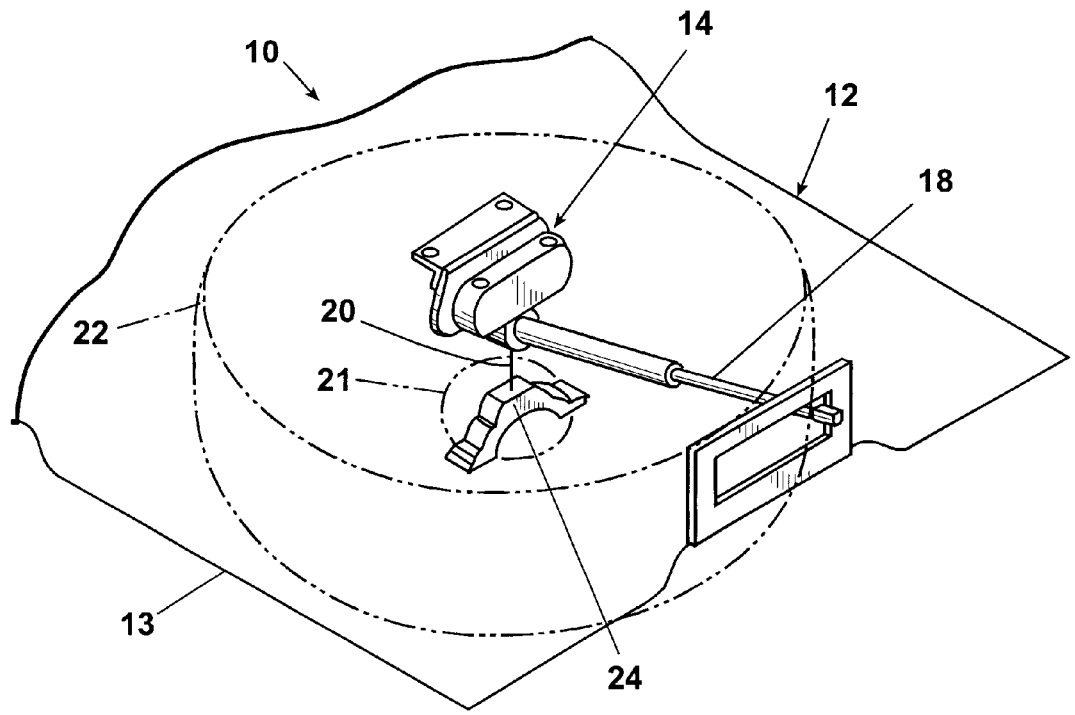
FIG. 1 is a perspective view of a spare tire carrier installed on the underside of a vehicle.
Figure 2:
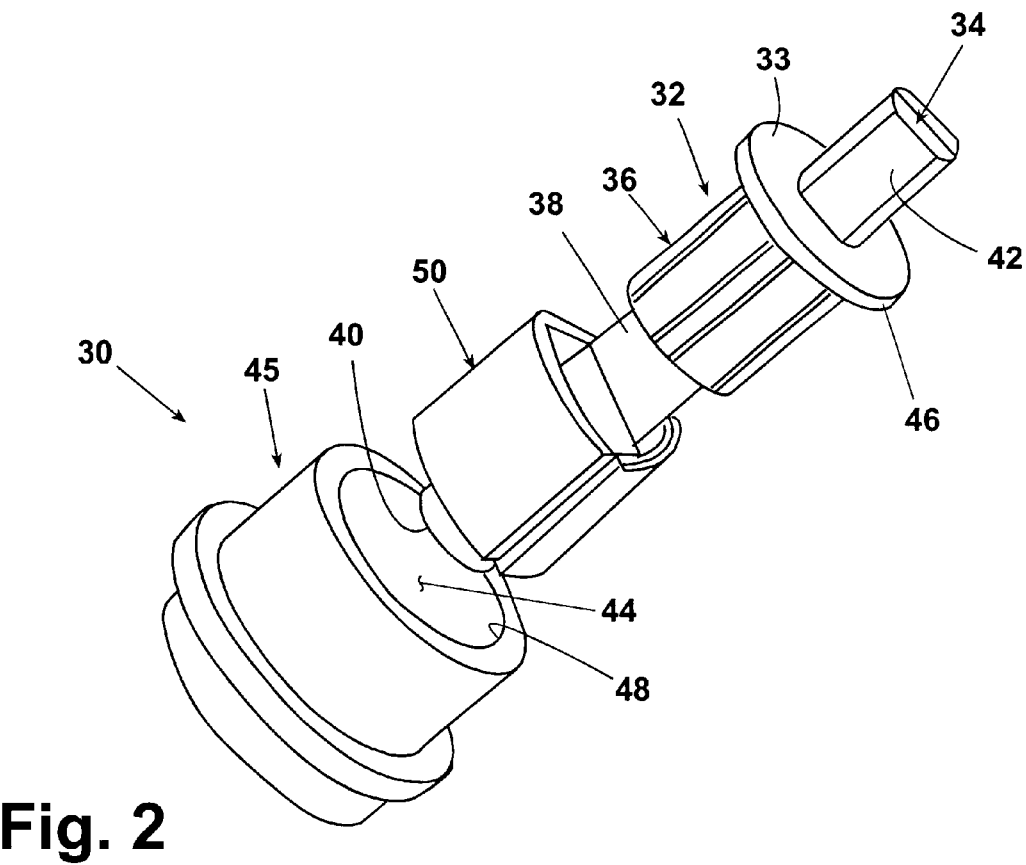
FIG. 2 is an exploded perspective view of a torque-limiting slip mechanism in accordance with the present invention.

A spare tire storage carrier 10 is illustrated in FIG. 1 for use on a vehicle 12. Carrier 10 is mounted to the underside 13 of vehicle 12 as shown in the figure. Carrier 10 includes a winch 14 contained within a housing 16. A rotatable input shaft 18 engages winch 14. Winch 14 includes a lift drum (not illustrated) to which a first end of a high tensile load wire 20 is secured. Wire 20 extends through the central opening 21 of a tire 22 such that a second end of wire 20 includes a tire holder 24 that engages the inner periphery of the opening such that tire 22 is disposed between the underside of vehicle 12 and the tire holder. As input shaft 18 is rotated by a user, wire 20 is either wound or unwound about the lift drum of winch 14, alternatively raising or lowering the tire as the length of exposed wire extending from winch 14 is either decreased or increased.

When tire 22 is raised, it is received in carrier 10. Once tire 22 engages the underside of vehicle 12, some additional tightening of wire 20 may be appropriate to provide appropriate compression of the compressible tire against the underside of the vehicle to prevent undesirable tire movement or banging. However, if wire 20 is overly tightened by continued rotation of the input shaft 18, the increased wire tension may cause the wire to snap. Tire 22 would then drop to the ground along with the broken end of wire 20 and tire holder 24, representing the failure of carrier 10.

To prevent the over tensioning of wire 20, an inventive torque limiting slip mechanism 30 is illustrated in FIGS. 2 through 8. Slip mechanism 30 includes a rigid camshaft 32 with a circumferential collar 33 separating a longitudinally extending outer key 34 from an adjacent poly-planar inner portion 36 from which an inner shaft 38 extends to terminate at a free end 40.

Figure 7:
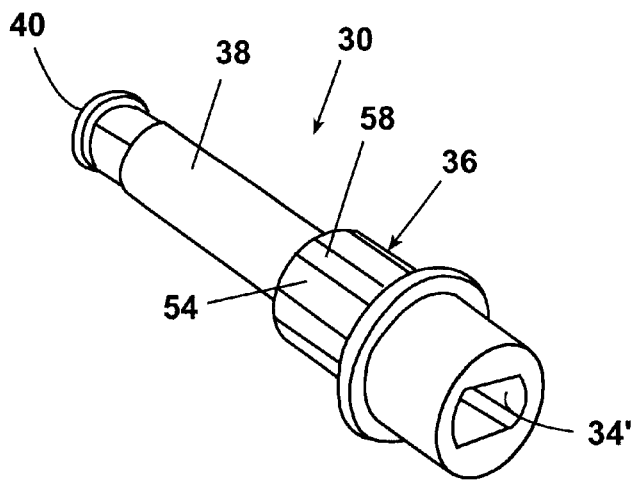
FIG. 7 is a perspective view of an alternative embodiment of the camshaft of the present invention.
Figure 8:
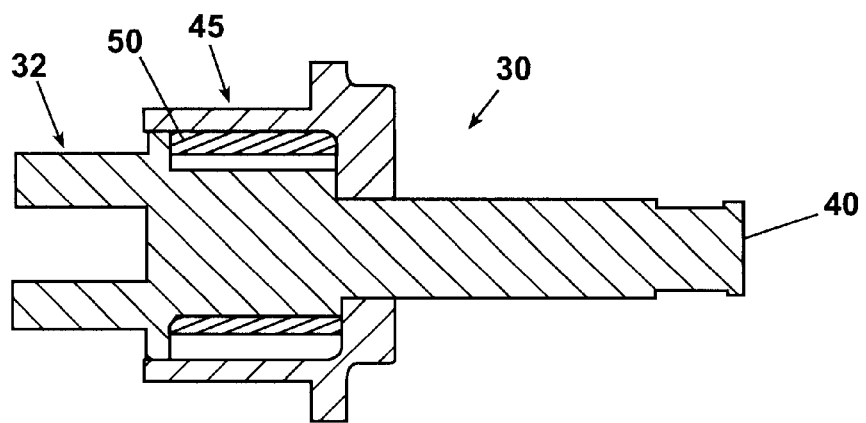
FIG. 8 is a cross-sectional side view of the torque-limiting slip mechanism when closed using the camshaft of FIG. 7.

Key 34 includes opposing flats 42 that engage a mating receptacle (not shown) within input shaft 18. Thus, as input shaft 18 is rotated, camshaft 32 is rotated with the flats 42 preventing slippage. In an alternative embodiment of camshaft 32, as illustrated in FIG. 7, input shaft 18 includes the key with the camshaft having the mating receptacle 42'. Preferably, camshaft 32 is formed from SAE 1020 or 10622 aluminum killed steel cold head quality. It is heat quenched and drowned to obtain surface hardness of approximately 30 to 35 Rockwell "C". The finish preferably comprises a zinc plating.

Camshaft 32 is received within an interior pocket 44 of a generally cylindrical eccentric rigid drive 45 with an outer periphery of 46 of collar 33 in close alignment with an interior wall 48 of pocket 44. Collar 33 does not prohibit the free rotation of camshaft 32 within pocket 44, but is closely adjacent to wall 48 to minimize the passage of contaminants into the pocket or the undesirable leaking of lubricant. Preferably, eccentric drive 45 is formed from a powdered metal. One such acceptable powdered metal is FC-0208-50. The powdered metal is then ceramic tumbled to provide desired surface finish characteristics.

Figure 6:
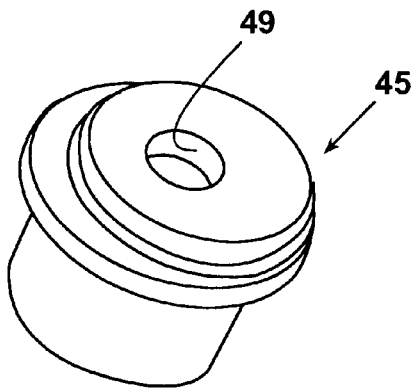
FIG. 6 is a perspective view of the eccentric drive of the present invention.

A different view of eccentric element 45 is illustrated in FIG. 6. Drive 45 includes an opening 49 centered with respect to pocket 44 through which inner shaft 38 extends. The outer periphery of eccentric drive 45 provides rotational torque to winch 14 including the lift drum as well understood in the art.

A plurality of spring elements 50 is also illustrated. Spring elements 50 are preferably formed from SAE 1074 steel austempered to have a surface hardness of approximately 48 to 53 Rockwell "C".

Figure 4:
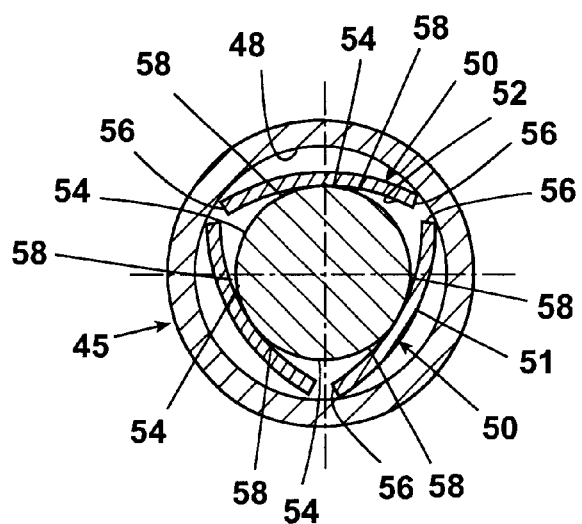
FIG. 4 is a cross-sectional view along lines 4—4 of FIG. 3.
Figure 5:
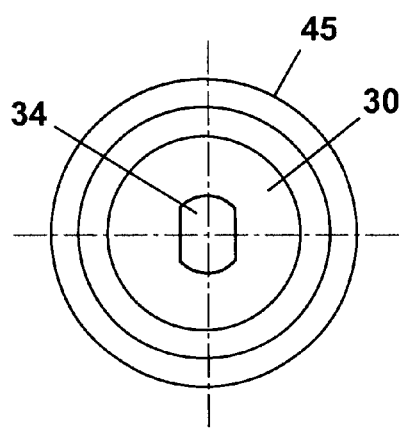
FIG. 5 is a front view of the torque-limiting slip mechanism.

Spring elements 50 extend longitudinally along poly-planar inner portion 36 and terminate adjacent inner shaft 38. As best shown in FIG. 4, each spring element 50 is arcuate in nature, having a central body 51 with a concave inner surface 52 engaging a mating surface 54 formed along inner portion 36 and opposing free ends 56 each engaging wall 48 of 44. The thickness of an element 50 is generally constant. Preferably, mating surface 54 is generally planar while the intermediate segments extend arcuately outwardly and share a generally constant diameter. Thus, spring elements 50 are biased toward a rest position provided by a mating surface and away from the intermediate segments, which should only be actively engaged during torque-limiting slippage. Other geometric arrangements are possible. For example, mating surface 54 may extend arcuately inwardly. A key requirement, however, is that there be an appropriate difference in surface geometry between a mating surface 54 and an adjacent segment 58 to promote spring element deformation upon reaching a torque level where slip is required.

On the other hand, the transition zone between a mating surface 54 and an adjacent intermediate segment must be carefully controlled to minimize jarring as the camshaft continues to be rotated during a slip condition. Unlike known prior art systems, when an overriding torque is applied mechanism 30 activates smoothly while still providing an appropriate resistance that indicates that input torque is no longer required to complete tire storage within the carrier. Thus, the problem of having jarring forces intermittently applied as the input shaft 18 is rotated, which a user may accidentally interpret as carrier failure, is minimized. However, the nature of the relationship between mating surface 54 and intermediate segments 58 is such that there is at least a subtle and controlled intermittent feedback mechanism as the spring elements alternatively elastically deform to contact the mating surfaces and intermediate segments upon camshaft rotation and engagement with a transition zone between elements 54 and 58.

In the illustrated embodiment, there are three generally identical spring elements 50 engaging three generally identical mating surfaces 54. There are actually six mating surfaces 54 equi-angularly spaced about the circumference of inner portion 36. Disposed between each of the mating surfaces are intermediate segments 58. Intermediate segments 58 have a much smaller circumferential extent than the mating surfaces 54. As a result, center body 51 has an increased tendency to immediately engage a mating surface 54 once a slip condition ceases. It also prevents undesirable loosening of wire 20, which would be detrimental to storage of tire 22 for the reasons discussed above. In FIG. 4, intermediate segments 58, which have a substantially smaller radial extent than mating surfaces 54, contact inner surface 52 of spring elements 50 when the spring elements are in their regular operational orientation. Adjacent free ends 56 are equally spaced from one another when disposed within pocket 44. In some instances, the free ends 56 may actually contact one another, but there should be no overlap between adjacent spring elements or inappropriate binding may result.

Figure 3:
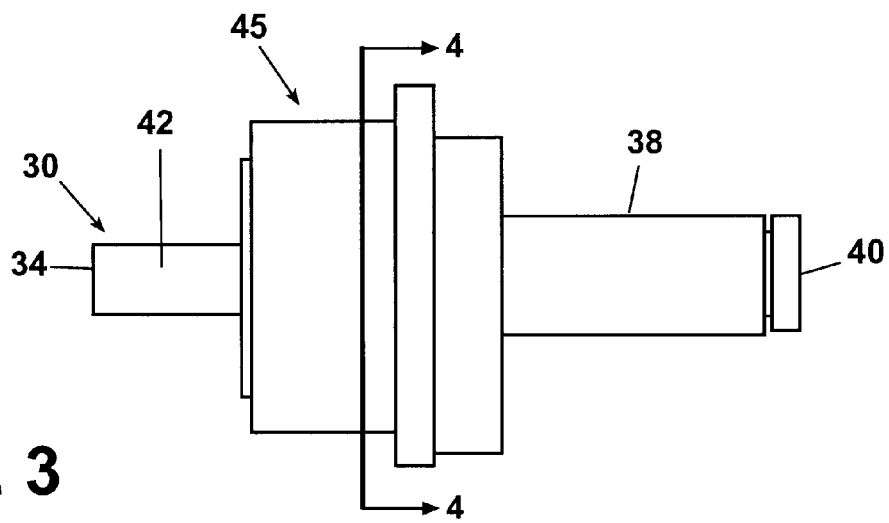
FIG. 3 is a side view of the torque-limiting slip mechanism when closed.

Slip mechanism 30 is shown in its closed configuration in FIGS. 3 and 4. In practice, free ends 56 of spring elements are compressed between camshaft 32 and interior wall 48 of pocket 44 such that the free ends are biased against the interior wall 48 to resist rotational motion of the camshaft 32 with respect to eccentric drive 45. Thus, as camshaft 32 rotates through a particular angular extent, spring elements 50 and eccentric drive 45 rotates through the same angular extent to wind or unwind wire 20. However, once tire 22 is snuggly against underside 13 of vehicle 12 within carrier 10, eccentric drive 45 is designed to stop rotating. Any additional torque applied through input shaft upon camshaft 32 greater than a set pre-determined torque is transmitted through the interface between camshaft 32 and wall 48 by way of spring elements 50. Spring elements 50 will elastically deform as camshaft 32 continues to rotate as a result of the different surface characteristics between mating surfaces 54 and intermediate segments 58, providing increased resistance to continued rotation of the camshaft and slippage between the camshaft and eccentric drive 45. Once the torque is released, however, the spring element promptly re-engages a mating surface 54, maintaining at least a minimum level of tension in wire 20 so that tire 22 is properly stowed. Then once the input shaft 18 is rotated in the opposite direction, spring elements 50 promptly re-engage mating surface 54, avoid contacting intermediate segments 58 and wire 20 will promptly be unwound with eccentric drive 45 rotating in concert with camshaft 32.

Preferably, a lubricating grease is liberally applied to spring elements 50 and camshaft portion 36 prior to installation within pocket 44 and the closing of the slip mechanism 30. The grease helps to hold spring elements 50 in place with respect to inner portion 36 before installation. After installation, the grease will trap undesirable contaminants before they can interfere with mechanism operation and help facilitate rotation of spring elements 50 within pocket 44 as necessary.

Slip mechanism 30 has a number of extremely desirable benefits not found in known slip mechanisms. First, since neither the free ends 56 nor the central body 51 of the elements 50 are rigidly connected with respect to their mating components, the spring elements are automatically rotationally centered under normal operational conditions to ensure proper coordinated rotation between camshaft 32 and eccentric drive 45. When torque-limiting rotation is required, however, the entire spring element will elastically deform as required with respect to its mating surface 54 and adjacent segment 58 as camshaft 32 continues to rotate to provide slippage between the camshaft and eccentric drive 45.

Typically, free ends 56 do not move with respect to interior wall 48. While not rigidly connected within a mating structure, they still usually pivot about a pivot point defined at the point of contact between free ends 56 and wall 48. However, it is envisioned that in some potential embodiments, circumferential surface movement between free ends 56 and interior wall 48 may be acceptable in a slip condition so long as the interface between free ends 56 and interior wall are optimized to promote slippage and minimize potential undesirable wear between the engaged elements.

At the very least, the free-floating nature of spring elements 50 and the lack of specific supporting structure about interior wall 48 simplifies assembly. Free ends 56 do not have to engage a specific pocket or groove as required in the prior art. The elastic deformation capabilities of spring elements 50 also minimize potential damage to the interior wall by spring element even if some slippage along interior wall 48 take place.

Once the input torque stops or falls below a critical level usually less than the pre-determined torque, the spring immediately re-centers itself with respect to a mating surface 54 as discussed above with intermediate segments 58 disposed on opposite sides of central body 51. The ability of spring elements 50 to change their orientation between camshaft 32 elements 54 and 58 as well as interior wall 48 is a direct result of being free-floating and non-rigidly secured within torque limiting slip mechanism 30.

Mechanism 30 is extremely compact. It takes up little if any additional room within carrier 10. Mechanism 30 is also deceptively easy to install and operate, thereby eliminating potential component failure experienced with known prior art systems.

It is also very simple to adjust mechanism 30 for different tire types through the use of different numbers or sizes of spring elements 30 or the characteristics of mating surfaces 54 or segments 58 without requiring any additional volume within pocket 48. Preferably, override torque is approximately about 37 Nm or less. However, cable tension after overriding is initiated should be on the order of approximately a minimum of 600 lbs, so override torque should be between approximately about 30 to 37 Nm.

While the invention has been specifically described in connection with certain specific embodiments thereof, it is to be understood that this is by way of illustration and not of limitation, and the scope of the appended claims should be construed as broadly as the prior art will permit. For example, it may be desirable to place the engagement surfaces and intermediate segments on interior wall 48 as opposed to camshaft 32. Under some circumstances the concavity of spring elements 50 may be reversed.

What is claimed is:

1. A torque-limiting slip mechanism for a spare tire carrier comprising:
   a camshaft, said camshaft including an outer section, a central section, and an inner section;
   a tire carrier drive including a pocket circumscribed by an interior wall;
   a plurality of free-floating spring elements disposed between said central section of said camshaft and said interior wall of said drive; and
   wherein spring elements prevent relative rotation between said camshaft and said drive such that said drive and said spring elements rotate through the same angular extent as said camshaft when a torque is applied to said camshaft unless a predetermined torque is exceeded.

2. A torque-limiting slip mechanism as recited in claim 1, wherein said spring elements comprise two free ends and a central body, each central body contacting a specific mating surface formed within said central section of said camshaft and said free ends contacting said interior wall.

3. A torque-limiting slip mechanism as recited in claim 2, wherein said spring elements include a concave inner surface engaging said mating surfaces of said central section.

4. A torque-limiting slip mechanism as recited in claim 2, wherein said free ends of said spring elements are biased against said interior wall, said spring elements being compressed between said camshaft and said interior wall.

5. A torque-limiting slip mechanism as recited in claim 4, wherein said central section includes intermediate segments adjacent to each mating surface, said mating surfaces and said intermediate segments having different dimensions such that when said pre-determined torque is exceeded and said camshaft continues to be rotated, said spring elements elastically deform as they alternatively engage said mating surfaces and said intermediate segments permitting said camshaft to rotate with respect to said carrier drive.

6. A torque-limiting slip mechanism as recited in claim 5, wherein said mating surfaces are generally identical and said intermediate segments are generally identical.

7. A torque-limiting slip mechanism as recited in claim 6, wherein a transition between said mating surfaces and said intermediate segments is dimensionally controlled to minimize jarring.

8. A torque-limiting slip mechanism as recited in claim 7, wherein said mating surfaces are planar generally planar and said intermediate segments are generally arcuate, said spring elements biased toward said mating surfaces and away from said intermediate segments when said torque is less than said pre-determined torque.

9. A torque-limiting slip mechanism as recited in claim 5, further including an intermittent feedback system defined by said mating surfaces and said intermediate segments, which is activated when said pre-determined torque is exceeded.

10. A torque-limiting slip mechanism as recited in claim 1, wherein the spring elements are generally equi-angularly disposed about said center section of said camshaft.

11. A torque-limiting slip mechanism as recited in claim 10, wherein adjacent free ends of each of said spring elements are spaced from one another.

12. A torque-limiting slip mechanism as recited in claim 10, wherein there are three spring elements.

13. A torque-limiting slip mechanism as recited in claim 1, wherein said spring elements lack rigid connections that prevent movement of said central body and said free ends with respect to either of said components.

14. A torque-limiting slip mechanism for a spare tire carrier comprising:
   a camshaft, said camshaft including an outer section, a central section, and an inner section, said central section including a plurality of mating surfaces and intermediate segments;
   a tire carrier drive including a generally cylindrical pocket circumscribed by an interior wall;
   a plurality of free-floating arcuate spring elements including two free ends and a central body being compressed between said central section of said camshaft and said interior wall, a concave inner surface of said central body contacting a mating surface of said camshaft and said free ends contacting said interior wall; and
   wherein said spring elements prevent relative rotation between said camshaft and said drive such that said drive and said spring elements rotate through the same angular extent as said camshaft when a torque is applied to said camshaft unless a pre-determined torque is exceeded.

15. A torque-limiting slip mechanism as recited in claim 14, wherein each spring element is automatically rotationally centered with respect to its mating surface when there is no torque and said spring element is elastically deformed with respect to its mating surface and an adjacent intermediate segment when said torque is greater than said pre-determined torque to provide slippage between said camshaft and said interior wall of said carrier drive.

16. A torque-limiting slip mechanism as recited in claim 15, wherein said mating surfaces are planar generally planar and said intermediate segments are generally arcuate.

17. A torque-limiting slip mechanism as recited in claim 16, wherein said mating surfaces are generally identical and said intermediate segments are generally identical.

18. A torque-limiting slip mechanism as recited in claim 17, wherein a transition between said mating surfaces and said intermediate segments is dimensionally controlled to minimize jarring.

19. A torque-limiting slip mechanism for a spare tire carrier comprising:
   a camshaft, said camshaft including an outer section, a central section, and an inner section, said central section including a plurality of mating surfaces generally equi-angularly spaced and separated by intermediate segments;
   a tire carrier drive including a generally cylindrical pocket circumscribed by an interior wall;
   a plurality of free-floating arcuate spring elements including two free ends and a central body being compressed between said central section of said camshaft and said interior wall, a concave inner surface of said central body contacting a mating surface of said camshaft and said free ends contacting said interior wall;
   wherein said spring elements prevent relative rotation between said camshaft and said drive such that said drive and said spring elements rotate through the same angular extent as said camshaft when a torque is applied to said camshaft unless a pre-determined torque is exceeded; and
   wherein each spring element is elastically deformed with respect to its mating surface and an adjacent intermediate segment when said torque is greater than said pre-determined torque to provide slippage between said camshaft and said interior wall of said carrier drive.

20. A torque-limiting slip mechanism as recited in claim 19, wherein said mating surfaces are planar and said intermediate segments are arcuate.

\* \* \* \* \*